United States Patent
Nelson et al.

(10) Patent No.: US 6,941,252 B2
(45) Date of Patent: Sep. 6, 2005

(54) STRIPING DATA FRAMES ACROSS PARALLEL FIBRE CHANNEL LINKS

(75) Inventors: Jeffrey J. Nelson, Louisville, CO (US); Robert Grant, Toronto (CA); Stephen Trevitt, Gormley (CA)

(73) Assignee: McDATA Corporation, Broomfield, CO (US)

( * ) Notice: Subject to any disclaimer, the term of this patent is extended or adjusted under 35 U.S.C. 154(b) by 727 days.

(21) Appl. No.: 09/809,996

(22) Filed: Mar. 14, 2001

(65) Prior Publication Data
US 2002/0161565 A1 Oct. 31, 2002

(51) Int. Cl.$^7$ .................. G06F 17/10; G06F 7/60; H04J 3/12
(52) U.S. Cl. .................. 703/2; 703/13; 370/509; 370/520
(58) Field of Search .................. 703/2, 13, 25, 703/21, 27; 370/509, 520, 474, 498, 503, 516, 535; 709/233, 226; 702/186, 79, 97; 714/4, 43, 700, 757

(56) References Cited

U.S. PATENT DOCUMENTS 5,267,240 A * 11/1993 Bartow et al. .............. 370/503
5,357,608 A * 10/1994 Bartow et al. .............. 709/227

(Continued)

FOREIGN PATENT DOCUMENTS

EP 0398038 A2 * 4/1990 .................. 714/4

OTHER PUBLICATIONS

Ludmila Cherkasova, Vadim Kotov, Tomas Rokicki, "Designing Fibre Channel Fabrics", IEEE 1995, pp. 346–351.*

Adiseshu et al., A Reliable and Scalable Striping Protocol, Aug. 1996, ACM SIGCOMM Computer Communication Review, Conference proceedings on Applications, technologies, architectures, and protocols for computer communications, vol. 26 Issue 4.*

Method to Send Striping Data Over One Link in an Optical Network, IBM Technical Disclosure Bulletin, Jan. 1992, vol. 34, No. 8, pp. 142–144, US.

Ezlo Valdevit, "Cascading in FIbre Channel: How to Build a Multi–Switch Fabric," Brocade Communications Systems Inc. (undated).

*Primary Examiner*—Kevin J. Teska
*Assistant Examiner*—Dwin M. Craig
(74) *Attorney, Agent, or Firm*—Hensley Kim & Edgington, LLC

(57) ABSTRACT

A method and system for aggregating a plurality of links to simulate a unitary connection among one or more nodes in a fibre channel system includes means for striping data frames across the links. One or more programmable hardware mechanisms, operatively connectable to the links and to nodes in the fabric, also are provided. A program for collecting information about variable link characteristics is included. Programmable hardware mechanisms provide in-order delivery of data frames across the links despite the variable link characteristics.

24 Claims, 3 Drawing Sheets

U.S. PATENT DOCUMENTS

| | | | |
|---|---|---|---|
| 5,418,939 A | | 5/1995 | Fredericks et al. |
| 5,425,020 A | * | 6/1995 | Gregg et al. .................. 370/503 |
| 5,455,830 A | * | 10/1995 | Gregg et al. .................. 714/700 |
| 5,455,831 A | * | 10/1995 | Bartow et al. ............... 714/700 |
| 5,544,345 A | | 8/1996 | Carpenter et al. |
| 5,548,623 A | * | 8/1996 | Casper et al. ................ 370/506 |
| 5,581,566 A | * | 12/1996 | St. John et al. .............. 714/757 |
| 5,586,264 A | | 12/1996 | Belknap et al. |
| 5,680,575 A | * | 10/1997 | Bartow et al. ............... 711/141 |
| 5,768,623 A | | 6/1998 | Judd et al. |
| 5,790,794 A | | 8/1998 | DuLac et al. |
| 5,793,770 A | * | 8/1998 | St. John et al. .............. 370/509 |
| 5,793,983 A | | 8/1998 | Albert et al. ........... 395/200.69 |
| 5,805,924 A | | 9/1998 | Stoevhase ................... 395/831 |
| 5,894,481 A | | 4/1999 | Book |
| 5,928,327 A | | 7/1999 | Wang et al. |
| 5,964,886 A | | 10/1999 | Slaughter et al. |
| 5,999,930 A | | 12/1999 | Wolff |
| 6,029,168 A | | 2/2000 | Frey |
| 6,094,683 A | * | 7/2000 | Drottar et al. ............... 709/226 |
| 6,148,004 A | | 11/2000 | Nelson et al. ............... 370/463 |
| 6,160,819 A | * | 12/2000 | Partridge et al. ........... 370/474 |
| 6,370,579 B1 | * | 4/2002 | Partridge .................... 709/226 |
| 6,667,993 B1 | * | 12/2003 | Lippett et al. .............. 370/509 |
| 2002/0161892 A1 | * | 10/2002 | Partridge .................... 709/226 |

* cited by examiner

STRIPING DATA FRAMES ACROSS PARALLEL FIBRE CHANNEL LINKS

BACKGROUND OF THE INVENTION

1. Field of the Invention

This invention pertains generally to a method for aggregating a plurality of links to simulate a unitary connection among one or more nodes in a fibre channel system. This invention is particularly, but not exclusively, useful for providing in-order delivery of data frames across the plurality of links without requiring reinitialization of the fabric in a fibre channel system due to variations in link characteristics.

2. Relevant Background

The information explosion of recent decades has, in part, driven requirements for enhanced computer performance that has increased significantly, if not exponentially. Consequently, demand for high-performance communications for server-to-storage and server-to-server networking has increased. Performance improvements in hardware entities, including storage, processors, and workstations, along with the move to distributed architectures such as client/server, have increased the demand for data-intensive and high-speed networking applications. The interconnections between and among these systems, and their input/output devices, require enhanced levels of performance in reliability, speed, and distance. Simultaneously, demands for more robust, highly available, disaster-tolerant computing resources, with ever-increasing speed and memory capabilities, continue unabated.

To satisfy such demands, the computer industry has worked to overcome performance problems often attributable to conventional I/O ("input/output") device subsystems. Mainframes, supercomputers, mass storage systems, workstations and very high resolution display subsystems frequently are connected to facilitate file and print sharing. Because of the demand for increased speed across such systems, networks and channels conventionally used for connections introduce communication clogging, aptly called "bottlenecks," especially if data is in large file format typical of graphically based applications.

Efforts to satisfy enhanced performance demands have been, in part, directed to providing storage interconnect solutions that address performance and reliability requirements of modern storage systems. At least three technologies are directed to solving those problems, SCSI ("Small Computer Systems Interface"); SSA ("Serial Storage Architecture"), a technology advanced primarily by IBM; and Fibre Channel ("F/C"), a high performance interconnect technology.

Two prevalent types of data communication connections exist between processors, and between a processor and peripherals. A "channel" provides direct or switched point-to-point connection communicating devices. The primary task of the channels is to transport data at the highest possible data rate, with the least amount of delay. Channels typically perform simple error correction in hardware. A "network", by contrast, is an aggregation of distributed nodes. A "node" as used in this document is either an individual computer or another machine in a network (workstations, mass storage units, etc.) with a protocol that supports interaction among the nodes. Typically, each node is capable of recognizing error conditions on the network, and provides the error management required to recover from error conditions. Protocols, of course, are analogous to various languages and dialects used in human speech; to the extent that a node can "understand" which protocol is used, all nodes in a system can "speak the same language." Fibre Channel systems typically are routed using a protocol known as the FCP Protocol, which like protocols in general, includes a data transmission convention encompassing timing, control, formatting, and data representation.

SCSI is an "intelligent" and parallel I/O bus on which various peripheral devices and controllers can exchange information. Although designed approximately 15 years ago, SCSI remains in use. The first SCSI standard, now known as SCSI-1, was adopted in 1986 and originally designed to accommodate up to eight devices at speeds of 5 MB/sec. SCSI standards and technology have been refined and extended frequently, providing ever faster data transfer rates up to 40 MB/sec. SCSI performance has doubled approximately every five years since the original standard was released; and the number of devices permitted on a single bus, for example, has been increased to 16. In addition, backward compatibility has been enhanced, enabling newer devices to coexist on a bus with older devices. Significant problems associated with SCSI remain, however, including, for example, limitations caused by bus speed, bus length, reliability, cost, and device count. In connection with bus length, originally limited to six meters, newer standards requiring even faster transfer rates and higher device populations now place more stringent limitations on bus length that are only partially cured by expensive differential cabling or extenders.

Accordingly, industry designers now seek to solve limitations inherent in SCSI by employing serial device interfaces. Featuring data transfer rates as high as 200 MB/sec, serial interfaces use point-to-point interconnections rather than busses. Serial designs also decrease cable complexity, simplify electrical requirements, and increase reliability. Two solutions have been considered, Serial Storage Architecture ("SSA") and what has become known as Fibre Channel technology, including the Fibre Channel Arbitrated Loop ("FC-AL").

Serial Storage Architecture is a high-speed serial interface designed to connect data storage devices, subsystems, servers and workstations. SSA was developed and is promoted as an industry standard by IBM; formal standardization processes began in 1992. Currently, SSA is undergoing approval processes as an ANSI standard. Although the basic transfer rate through an SSA port is only 20 MB/sec, SSA is dual ported and full-duplex, resulting in a maximum aggregate transfer speed of up to 80 MB/sec. SSA connections are carried over thin, shielded, four-wire (two differential pairs) cables, which are less expensive and more flexible than the typical 50- and 68-conductor SCSI cables. Currently, IBM is the only major disk drive manufacturer shipping SSA drives; there has been little industry-wide support for SSA. That is not true of Fibre Channel, which has achieved wide industry support.

Fibre Channel is an industry-standard, high-speed serial data transfer interface used to connect systems and storage in point-to-point or switched topologies. FC-AL technology, developed with storage connectivity in mind, is a recent enhancement that also supports copper media and loops containing up to 126 devices, or nodes. Briefly, fibre channel is a switched protocol that allows concurrent communication among workstations, super computers and various peripherals. The total network bandwidth provided by fibre channel may be on the order of a terabit per second. Fibre channel is capable of transmitting frames along links (also, "lines" or "lanes") at rates exceeding 1 gigabit per second in at least two directions simultaneously. F/C technology also is able to transport commands and data according to existing protocols such a Internet protocol ("IP"), high performance parallel interface ("HIPPI"), intelligent peripheral interface ("IPI"), and, as indicated using SCSI, over and across both optical fiber and copper cable. Fibre Channel may be considered a channel-network hybrid. A Fibre Channel system contains sufficient network features to provide connectivity, distance and protocol multiplexing, and enough channel features to retain simplicity, repeatable performance and reliable delivery. Fibre channel allows for an active, intelligent interconnection scheme, known as a "fabric," as well as fibre channel switches to connect nodes.

The F/C fabric includes a plurality of fabric-ports (F_ports) that provide for interconnection and frame transfer between plurality of node-ports (N_ports) attached to associated devices that may include workstations, super computers and/or peripherals. A fabric has the capability of routing frames based on information contained within the frames. The N_port transmits and receives data to and from the fabric. Transmission is isolated from the control protocol so that different topologies (e.g., point-to-point links, rings, multidrop buses, and crosspoint switches) can be implemented. Fibre Channel, a highly reliable, gigabit interconnect technology allows concurrent communications among workstations, mainframes, servers, data storage systems, and other peripherals. F/C technology not only provides interconnect systems for multiple topologies that can scale to a total system bandwidth on the order of a terabit per second, but also can deliver a high level of reliability and throughput. Switches, hubs, storage systems, storage devices, and adapters designed for the F/C environment are available now.

Following a lengthy review of existing equipment and standards, the Fibre Channel standards group realized that it would be useful for channels and networks to share the same fiber. (The terms "fiber" or "fibre" are used synonymously, and include both optical and copper cables.) A Fibre Channel protocol was developed and adopted, and continues to be developed, as the American National Standard for Information Systems ("ANSI"). See Fibre Channel Physical and Signaling Interface, Revision 4.2, American National Standard for Information Systems (ANSI) (1993) for a detailed discussion of the fibre channel standards, which is incorporated by reference into this document.

Current standards for F/C support bandwidth of 133 Mb/sec, 266 Mb/sec, 532 Mb/sec, 1.0625 Gb/sec, and 2 Gb/sec (proposed) at distances of up to ten kilometers. Fibre Channel's current maximum data rate at 1.0625 Gb/sec is 100 MB/sec (200 MB/sec full-duplex) after accounting for overhead. In addition to strong channel characteristics, Fibre Channel provides powerful networking capabilities, allowing switches and hubs to interconnect systems and storage into tightly-knit clusters. The clusters are capable of providing high levels of performance for file service, database management, or general purpose computing. Because Fibre Channel is able to span up to 10 kilometers between nodes, F/C allows very high-speed movement of data between systems that are greatly separated from one another.

Also, the F/C standard defines a layered protocol architecture consisting of five layers, the highest layer defining mappings from other communication protocols onto the F/C fabric.

The network behind the servers links one or more servers to one or more storage systems. Each storage system may be RAID ("Redundant Array of Inexpensive Disks"), tape backup, tape library, CD-ROM library, or JBOD ("Just a Bunch of Disks").

Fibre Channel networks have proven robust and resilient, and include at least these features: shared storage among systems; scalable networking; high performance; fast data access and backup. In a Fibre Channel network, legacy storage systems are interfaced using a Fibre Channel to SCSI bridge. Fibre Channel standards include network features that provide required connectivity, distance, and protocol multiplexing. F/C also supports traditional channel features for simplicity, repeatable performance, and guaranteed delivery.

The Fibre Channel industry standards also provide for several different types, or classes, of data transfers. A class 1 transfer requires circuit switching, i.e., reserved data paths through the network switch, and generally involves the transfer of more than one frame, frequently numerous frames, between two identified network elements. In contrast, a class 2 transfer requires allocation of a path through the network switch for each transfer of a single frame from one network element to another. Frame switching for class 2 transfers is more difficult to implement that class 1 circuit switching because frame switching requires a memory mechanism for temporarily storing incoming frames in a source queue prior to their routing to a destination port, or a destination queue at a central destination port. A memory mechanism typically includes numerous input/output connections with associated support circuitry and queuing logic. Additional complexity and hardware is required when channels carrying data at different bit rates are to be interfaced.

At least one standard in connection with Fibre Channel technology imposes the requirement to maintain guaranteed in-order delivery of data frames across connecting links, regardless of cable distances ("Distance Standard"). As indicated, the Distance Standard cannot be satisfied using SCSI technology. Known striping methods for transmitting data frames across links include byte striping and word striping. Both have disadvantages in the Fibre Channel environment because of the high-speed requirements for data movement and transfer. Both byte striping and word striping require not only multiple links, but also that links remain open during transmission of data. As indicated, in an environment demanding significantly accelerated speeds of data movement, not all links will remain "open"; not all lanes consistently and continually will deliver frames at an appointed or expected point in proper sequence. The result has been described as a bottleneck, the inability of each successive frame to pass across each link in a prescribed or desired order or sequence.

To achieve the objective of sequential, in-order delivery of data frames across connecting links, existing methods and apparatus require that all cables and channels be similar in length. Otherwise, alignment problems attributable to delayed sequencing occur. Those skilled in the art sometimes refer to delayed sequencing of data in the form of frames as "jitter." Existing technologies are unable to provide sufficient error management to overcome the problems of clogging, bottlenecks, and jitter.

The present invention eliminates the problems associated with byte and word striping; frame striping is employed. By directing successive data frames across links connecting entities in a F/C environment, load balancing is achieved across all links. As viewed by software associated with F/C technology, frame striping may be viewed or perceived as one vertical length or link; the links may be aggregated to simulate a unitary connection among the nodes. This eliminates the adverse consequences caused by variable link characteristics, including different cable lengths. Accordingly, problems associated at least with differences in length are avoided. Considering the pragmatic problems that impact operation of a F/C network, if one F/C link is cut or disable, the present invention will continue to stripe data frames across the remaining links. Thus, unlike the problems inherent in the conventional SCSI system, a disruption on one link will not affect operation of the system as a whole. The present invention quickly reallocates traffic across the links.

Inter-Element Links ("IEL's"); or Inter-Switch Links ("ISL's") as they are sometimes referred to, between entities in a network system has, until now, proven to be a significant limiting factor to successful in-order data delivery in connection with the Delivery Standard. As the lengths change between points in the fabric, or between entities in the network, without the present invention the fabric must be reinitialized and new routing paths configured.

Therefore, a previously unaddressed need exists in the industry for a new, useful and reliable method and apparatus for aggregating links in networks, particularly in a Fibre Channel environment. It would be of considerable advantage to provide a method and apparatus that aggregates a plurality of links to simulate a unitary connection among one or more nodes in a fibre channel system, thus enabling in-order delivery of data frames across the plurality of links without reinitializing the fabric in a fibre channel system due to variations in link characteristics.

SUMMARY OF THE INVENTION

In accordance with the present invention a method for aggregating links to simulate a unitary connection among one or more nodes in a fibre channel system is provided. According to the present invention, a method for aggregating a plurality of links to simulate a unitary connection among one or more nodes in a fibre channel system includes providing means for striping data frames across the links. Striping data frames includes transmitting data frames in their entirety across individual links.

Programmable hardware mechanisms are connected to the links, as well as to the nodes. The nodes may include by way of example, and not of limitation, fibre channel switches. A programmable hardware mechanism may include a link controller connected to at least the links.

The hardware mechanisms hold a program. The program includes at least an algorithm that provides at least a sequence of instructions for collecting information about each of the links. The information includes the time required for a representative pattern of data to be transmitted and received across the links. The algorithm therefore enables the hardware mechanism to calculate the length of links within the system. The collected information may be tabulated into a table of link length information for each link.

In-order delivery of data across the links is affected by variable link characteristics. Variable link characteristics include, without limitation, different link lengths. To overcome problems precluding in-order delivery of data frames across links due to variable link characteristics, the present invention includes the programmable hardware mechanism that is operatively coupled to devices connected to the links.

The program stored in the programmable hardware mechanism collects information about the variable link characteristics to be processed by the program. The programmable hardware mechanism also may include a link controller. The link controller is connectable to the links. In addition, the present invention may include a queue scheduler that is connected to at least the link controller and to the links. Further, queue schedulers and buffers are included for routing the collected information. In addition, queue schedulers may be included. The combination of elements, and application of the method, of the present invention provides in-order data delivery across the links of a fibre channel system, regardless of intervening system disruptions caused by the link characteristics.

At least one objective of the hardware mechanisms is to reallocate bandwidth among the plurality of links to overcome problems of bandwidth over-subscription as well as under subscription. The programmable hardware mechanism also tabulates additional information for ensuring in-order delivery of the data frames across the plurality of links.

The present invention also will guarantee in-order delivery of data from point-to-point even though, paradoxically, each frame may not arrive at each delivery point in sequence. The present invention aggregates the links to obviate the need for sequential delivery of data frames at each point.

Yet another advantage of the present invention is a method for selectively transmitting frames across a fibre channel fabric that is easy to use and to practice, and is cost effective.

These advantages, and other objects and features, of such a method for aggregating a plurality of links to simulate a unitary connection among one or more nodes in a fibre channel system to provide in-order delivery of data frames across the plurality of links without reinitializing the fabric in a fibre channel system due to variations in link characteristics, will become apparent to those skilled in the art when read in conjunction with the accompanying following description, drawing figures, and appended claims.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The foregoing has outlined broadly the more important features of the invention to better understand the detailed description that follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Briefly, the present invention provides a method for aggregating a plurality of links to simulate a unitary connection among one or more nodes in a fibre channel system, providing in-order delivery of data frames across the plurality of links without requiring reinitialization of the fabric in a fibre channel system due to variations in link characteristics.

Figure 1:
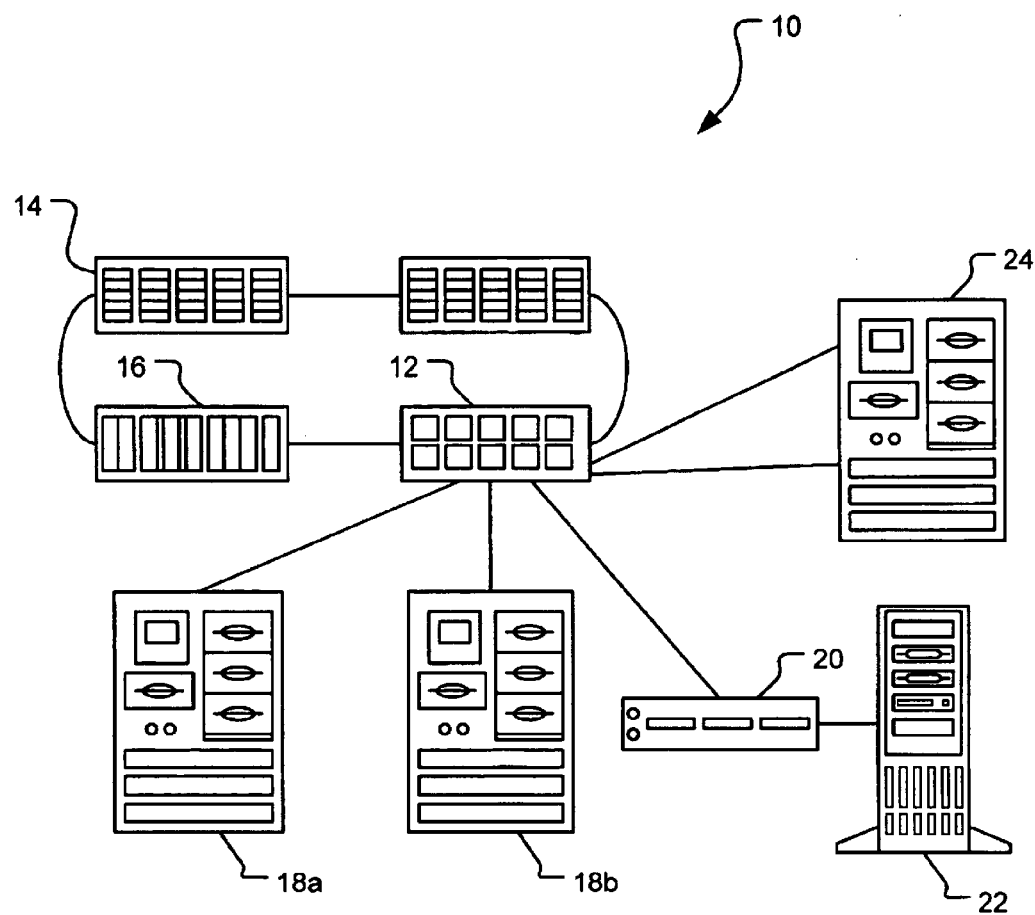
FIG. 1 is a schematic diagram showing one of many ways a number of devices, including a Fibre Channel switch, may be interconnected in a Fibre Channel network.

Referring first to FIG. 1, a schematic and block diagram is shown illustrating in general a representative fibre channel fabric 10 that includes a switch 12. Fabric 10 also may include a device called a JBOD ("Just a Bunch of Disks") 14, a disk array 16, one or more servers 18a and 18b, an SCSI bridge 20 to an SCSI RAID ("Redundant Array of Inexpensive Disks") 22, as well as a Fibre Channel RAID 24 (collectively, "Devices 14–24"). One of the important devices in the F/C fabric or system is switch 12, which enables a Fibre Channel system to transmit and received the extraordinary amounts of data at great speed.

Figure 2:
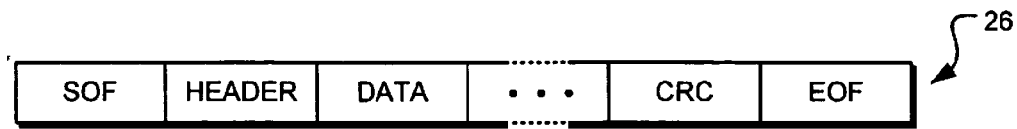
FIG. 2 is schematic representation of a variable-length frame communicated through a fiber optic switch as contemplated by the Fibre Channel industry standard.

As used in this document, and as shown in FIG. 2, a "frame" or "data frame" 26 is the smallest individual packet of data that is sent and received on a link, and includes a presumed configuration of an aggregation of data bits into multiple data frames, such as the data frame 26 exemplified in FIG. 2.

Figure 3:
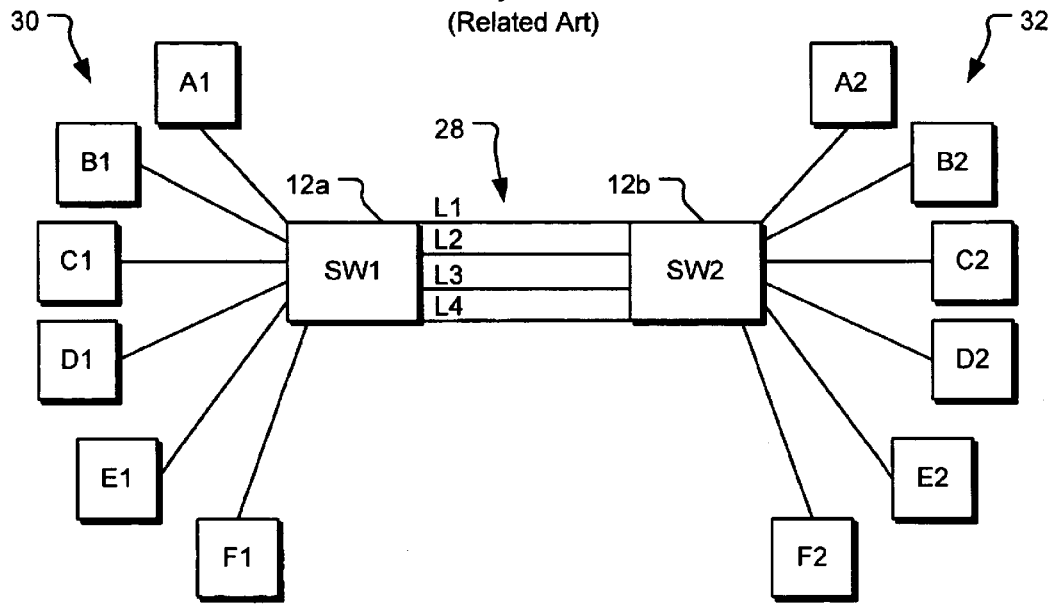
FIG. 3 is a schematic block diagram showing six nodes connected to four links in a representative fibre channel system.

As shown in FIG. 3, the present invention provides a method for aggregating a plurality of links 28 to appear as a single virtual link (not shown) either between switch 12a and switch 12b, or between Devices 14–24 and a switch 12. Plurality of links 28 is also labeled for clarity in FIG. 3 as "L1–L4". As indicated, the present invention trains a fibre channel system to consider plurality of links 28 as a single link for purposes of passing data frames 26 across links 28. The present invention thus compensates for different link characteristics, including at least differences lengths of links L1–L4, particularly differences in the length of links 28 between nodes 30 and 32 in fabric 10. The present invention determines the length differentials of links 28 in part by calculating the amount of time required for a data frame 26 to cross links 28. The present invention causes a fibre channel system to "see" the four or more links shown in FIG. 3 as a single virtual link for purposes of passing data frames 26 across a series of links L1–L4.

At least one advantage of the present invention is that the method allows for hardware-based load balancing across plurality of links 28, while achieving and maintaining requirements of fibre channel standards requiring in-order, guaranteed delivery of data frames 26 across plurality of links 28 regardless of the cable distances. The hardware-based implementation of the method of the present invention, more fully described below, automatically adjusts link characteristics in connection with or with respect to cable or other port level failures without disrupting fabric 10, and without requiring reinitialization of fabric 10.

In a fibre channel environment not having the advantages of the present invention, links 28 connecting nodes 30 and 32 in fabric 10 must be substantially similar in length. If links 28 are not substantially similar in length, the length differential engenders alignment problems within the system, that cause delays frequently call "jitter." Frame striping is employed to assist in reallocate data traffic across links 28, overcoming the limitation of word or byte striping, which requires the same number of links as there are words, a problem that has become more pronounced as links comprising a combination of four links, as shown in FIG. 3, have become more standard in the field.

As shown in FIG. 3, ISL's in the form of plurality of links 28 assign both source nodes and destination nodes across ISL's without respect to, and knowledge of, potential bandwidth utilization. For example, FIG. 3 shows a hypothetical six nodes 30, individually labeled A1–F1, connected to switch 12a, also labeled SW1 for clarity. Nodes A1–F1 are connected through switch 12a across plurality of links 28 to switch 12b, also labeled SW2 for clarity. Switch 12b is connected to nodes 32, individually labeled A2–F2. For purposes of explication, it is assumed that at fabric initialization time, routes through fabric 10 are established. If, in the configuration shown in FIG. 3, servers 18a or 18b as shown in FIG. 1 are attached to SW1; a storage device such as F/C RAID 24 is attached to SW2; further assuming that each server required 50 MB for each direction, and further assuming that the links had a capacity of 100 MB, the load would be split equally between only two storage devices for a total of 300 MB (6×50) in each direction. Accordingly, the four ISL's in plurality of links 28 between switches 12a and 12b provide 400 MB in each direction. Accordingly, 25% additional bandwidth is available. As used in this document, the term "bandwidth" means the rate at which a communications system can transmit data or, more technically, the range of frequencies that an electronic system can transmit. High bandwidth allows fast transmission or the transmission of many signals at once, a criterion of significant importance in the high-speed transmission through fibre channel systems.

Because data traffic patterns across links 28 are not known at the time of initialization, and because the rate and volume of traffic across links 28 are dependent on executing applications through servers 18a and 18b, as shown in FIG. 1, a condition aptly called "bottlenecks" on one or more ISL's may occur. Due to a bottleneck, a F/C system may not have enough bandwidth across links 28. For example, as shown in FIG. 3, each node A1–F1 has 50 MB capacity so the collectively nodes A1–F1 have a total of three hundred MB/s. In a storage configuration, therefore, the results shown in Tables 1–3 may follow. ISL link requirements would be as shown in Table 1.

TABLE 1

| MB | Connections |
|---|---|
| 25 | A1–A2 |
| 25 | A1–B2 |
| 25 | B1–A2 |
| 25 | B1–F2 |
| 25 | C1–A2 |
| 25 | C1–C2 |
| 25 | D1–F2 |
| 25 | D1–C2 |
| 25 | E1–E2 |
| 25 | E1–D2 |
| 25 | F1–E2 |
| 25 | F1–D2 |

Based on Table 1, the following bandwidths are required, based on the data traffic between A1–F1 having 50 MB for a throughput total of 300MB:

TABLE 2

| Node | MB Required |
|---|---|
| A2 | 75 |
| B2 | 50 |
| C2 | 50 |
| D2 | 25 |
| E2 | 75 |
| F2 | 25 |

It follows, therefore, that ISL link requirements would be:

TABLE 3

| Link | MB Requirements |
|---|---|
| L1 | 150 |
| L2 | 50 |
| L3 | 50 |
| L4 | 50 |

Tables 1–3 demonstrate that with only one hundred MB capacity available on each ISL link A1–F1, as shown in FIG. 3, link 1 ("L1") is over-subscribed, thus causing system performance degradation.

If this problem were extant in a conventional 4-ISL configuration of four links 28, as shown in FIG. 3, two alternatives may be available for redistribution of data traffic in a fibre channel environment. One alternative for redistribution of bandwidth across the four links L1–L4 is to program the ISL's for an Error_Detect_Timeout_Value, typically two seconds, followed by reallocation of the routes across links 28. Another alternative for redistribution of traffic across links 28 is to reallocate the routes by creating a distribution plan for out-of-order delivery of frames 26. For example, if nodes A1 and B1 used L2 instead of L1, it might be possible to buffer frames 26 in SW1 from A1 to B1 on L1 to cause delivery to occur after frames 26 have used L2.

Either alternative, however, accepts the likelihood of performance degradation because of the time delay of two seconds, or because a command to conduct out-of-order delivery of frames 26 for passage across links 28 would, as applications change among nodes 30 and 32, cause new bottlenecks to be introduced, thus compounding the problems sought to be overcome by the present invention.

Perhaps yet another alternative available under current technology to solve inadequate allocation of bandwidth would be to apply options from current 10 GB technologies, by employing byte striping or word striping across links 28. Although this approach might supply adequate bandwidth, the solution is only temporary: application of byte striping or word striping introduces a potential single point of failure in the system as a whole. Additionally, using byte and word striping requires cable link matching to avoid improper byte/load alignment caused by the distance or length of cable limitations, particularly in metropolitan distances.

The present invention solves the foregoing problems and limitations by providing a method for frame striping across links 28. The method provides structural elements within internal switching elements to hunt for available paths across links 28, including the conventional four ISL configurations shown in FIG. 3. The method of the present invention causes a plurality of links 28, in a conventional configuration of four ISL's, to appear to system software as a single "virtual" ISL.

Figure 4:
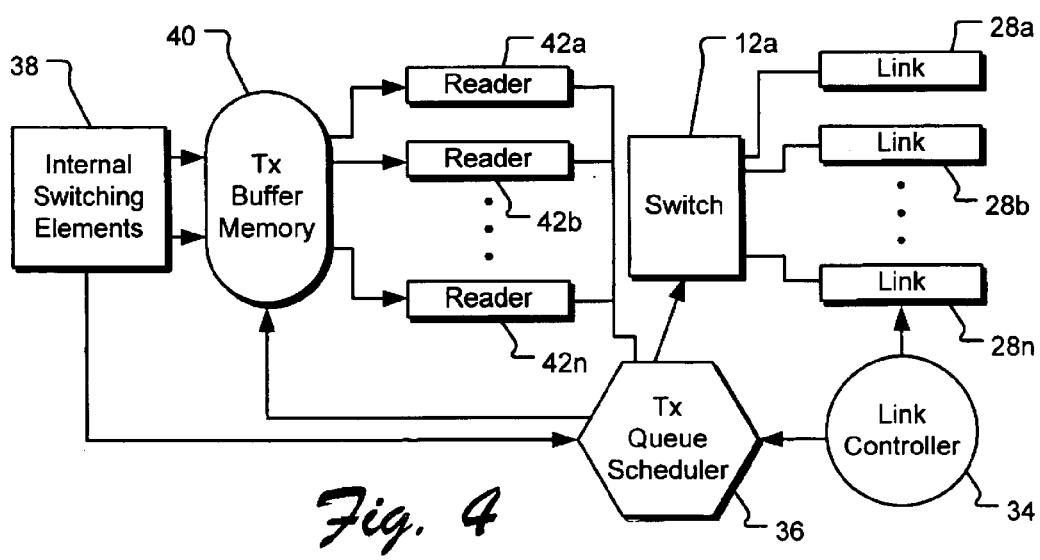
FIG. 4 is a schematic block flow diagram showing one way in which the method for aggregating a plurality of links to simulate a unitary connection among one or more nodes in a fibre channel system may be implemented.

As shown by cross-reference between FIGS. 3 and 4, the method of the present invention includes a hardware mechanism 34 that is programmed by software management to adjust for link characteristic differences across links 28, to make it appear to the system that plurality of links 28 is but a single link (not shown) for purposes of passing data frames 26 across links 28. Hardware mechanisms 34 associated with the present invention provide load balancing across links 28, and guarantee in-order delivery of data frames 26 between, for example, a source port and a destination port, or as represented in FIG. 3, between nodes A1 and B2.

In a conventional configuration for ISL's, as shown in FIG. 3, one or more algorithms associated with the software, and well known to those skilled in the art, is configurable to detect, or may dynamically detect, variable link characteristics. The one or more algorithms may be executed to calculate lengths of links 28, such as L1–L4, as shown in FIG. 3. The algorithm and hardware mechanism 34 send patterns of signals and data during transmit and receive functions. When such a pattern is sent, a counter, not shown but locatable in hardware mechanism 34, is started. When the pattern is received back at the transmitting source, the counter stops. Cable length, therefore, may be mathematically determined from the time to transmit and receive, and the cable lengths also may be compared to identify at least one variable link characteristic, namely link length. When time and link length differences are determined, and time delays have been determined for each link L1–L4, link-to-link gap time may be established by the software associated with hardware mechanism 34. In a preferred embodiment of the present invention, as shown in FIG. 4, hardware mechanism 34 is a link controller 34. Link controller 34 does not transmit consecutive frames between the same SRC/DST port pairs until the first transmitted frame 26 has traveled far enough down a link L1–L4 to guarantee that it will be received at a receiving node 32, for example F2 as shown in FIG. 3, before a second frame is received. This may result in link-to-link inter-frame gap ("IFG") time. The IFG time will be dependent on individual links and variable link characteristics involved, and is a calculation only required when link controller 34 determines that an existing data frame 26 is in flight across fabric 10, and a subsequent data frame 26 with the same SRC/DST pair must be transmitted. A transmit queue scheduler 36, as shown in FIG. 4, receives data frames 26 from internal switching elements 38, and for scheduling data frames 26 for transmission across links 28.

As indicated, link controller 34 calculates the length of each link L1–L4. Length calculations are accomplished by sending patterns across links 28, and by providing hardware mechanism 34 to transmit and receive transmission loopbacks well known to those skilled in the art. The transmission loop-back value permits establishment of a table of values, created by the software within hardware mechanism 34 for each link L1–L4, which thus identifies the cable length in clock increments. The term "clock" as used in this document means the circuit that generates a series of evenly spaced pulses. All switching activity occurs while the clock is sending out pulses. Between pulses, the devices are allowed to stabilize. The count being maintained by the clock expires when the head of a data frame 26 is received at a remote node 32. The software in hardware mechanism 34 thus calculates differences in comparison with every other link 28 in the group. The information resulting from those calculation is maintained in the transmit queue scheduler 36 as shown in FIG. 4.

As also shown in FIG. 4, frames 26 are received by a transmit buffer memory 40 from internal switching element 38. Transmit queue scheduler 36 copies the SRC/DST address information from a frame 26, and a queue entry is established. As links 28 become part of transmit queue scheduler 36, transmit queue scheduler 36 maintains the status of which SRC/DST frames has been transmitted across links 28, and also identifies which links L1–L4 frames 26 have been transmitted across. As subsequent data frames 26 are received in transmit buffer memory 40, transmit queue scheduler 36 compares SRC/DST data against current frames 26 being transmitted across other links 28. If no SRC/DST matches are made, frames 26 may be immediately transferred to an available link L1–L4 among plurality of links 28. If a match is made, the software associated with hardware mechanism 34 performs one or more calculations with respect to the link length differences among links 28 last matching the SRC/DST frame 26 that was transmitted on and is currently available in links 28. If it can be guaranteed that the currently transmitted frame 26 will be received at a remote node 32 switch before a following frame 26, it can immediately be transmitted; otherwise, a frame 26 must be queued until it can be transmitted to arrive in-order.

Figure 5:
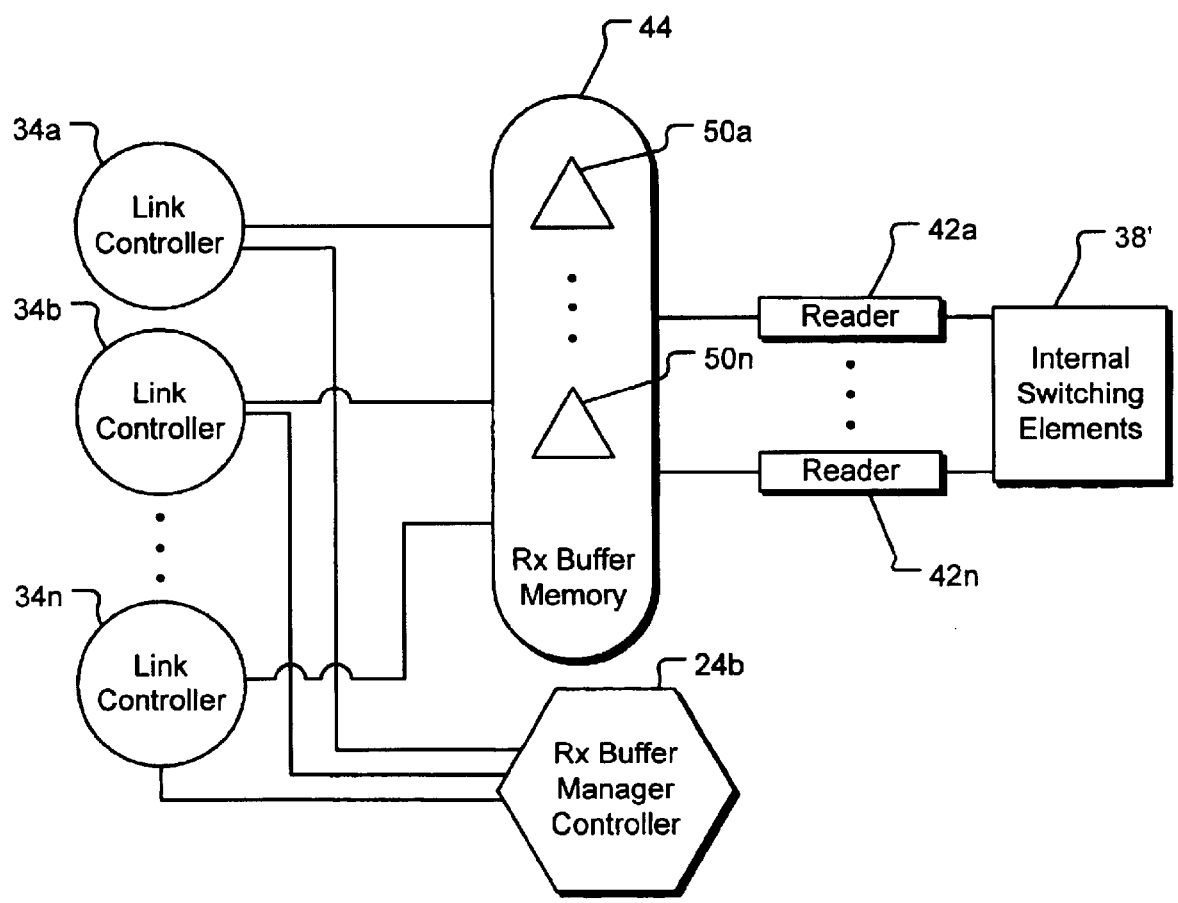
FIG. 5 is a schematic block flow diagram showing one way in which the method for aggregating a plurality of links to simulate a unitary connection among one or more nodes in a fibre channel system may be implemented on receipt of data frames.

As shown in FIG. 5, at the data frame 26 receiving end of the plurality of links 28, one or more link controllers 34a through 34n, are provided for receiving frames 26. Each link controller 34 a–n is allocated one or more buffers 50 within the shared received buffer memory 44. Link controllers 34a–n will sort and compare received frames 26. Information accumulated by links controllers 34a–n is combined with a buffer 50 number that contains data frame 26. The information is transmitted to the central queue manager 46. Because the transmit logic of software associated with hardware mechanism 34 guarantees in-order delivery of data frames 26 to remote switches, the system algorithm may employ first-in-first-out queue information. As connections are made to internal switching elements 38', any buffer 50 can transmit data frames 26 across links 28. Thus, as internal links become available, central queue manager 46 requests connection to the physical destination port when a connection is established, and passes the buffer 50 number to a reader 42a–42n for transmission to internal switch 38', and passes buffer 50 back to link controllers 34a–34n for buffer management and link control.

While the method for aggregating a plurality of links to simulate a unitary connection among one or more nodes in a fibre channel system as shown in drawing FIGS. 1 through 5 is one embodiment of the present invention, it is indeed but one embodiment of the invention, is not intended to be exclusive, and is not a limitation of the present invention. While the particular method for scoring queued frames for selective transmission through a switch as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. A method of transmitting a sequence of ordered data frames from a source node over a plurality of communication links to provide in-order delivery of the data frames at a destination node, the method comprising:

computing a link length difference for each pair of communication links based on a link length characteristic of each communication link in the pair;

transmitting to the destination node a first data frame of the ordered data frames over a first link of the communication links;

selecting a second link of the communication links based on the link length difference associated with the first and second links to ensure that a next data frame of the ordered data frames is received at the destination node after the first data frame is received at the destination node; and transmitting the next data frame over the second link to the destination node.

2. The method of claim 1 wherein the computing operation comprises:

detecting the link length characteristic associated with each communication link; and computing the link length difference for a pair of communication links based on the detected link length characteristic of each communication link in the pair.

3. The method of claim 1 wherein the computing operation comprises:

detecting the link length characteristic associated with each communication link, wherein the link length difference for a pair of communication links is computed from a difference between the detected link length characteristics of the communication links in the pair.

4. The method of claim 1 further comprising:

maintaining a record identifying a communication link across which a data frame is transmitted.

5. The method of claim 1 further comprising:

maintaining status information on a data frame transmitted across the communication links.

6. The method of claim 1 wherein the selecting operation further comprises:

comparing information about the next data frame with information about other data frames being transmitted across the communication links; and if the information about the next data frame does not match the information about any of the other data frames, then transmitting the next data frame across any available communication link.

7. The method of claim 1 wherein the selecting operation further comprises:

comparing information about the next data frame with information about other data frames being transmitted across the communication links; and if the information about the next data frame matches the information about any of the other data frames, then evaluating a link length difference between the communication link across which the matching data frame was transmitted and another available communication link, and transmitting the next data frame across the other available communication link, if the evaluated link length difference ensures that the next data frame will be received at the destination node via the other available communication link after the first data frame is received at the destination node.

8. The method of claim 1 wherein the selecting operation further comprises:

comparing information about the next data frame with information about other data frames being transmitted across the communication links; and if the information about the next data frame matches the information about any of the other data frames, then evaluating link length differences between the communication link across which the matching data frame was transmitted and other available communication links, queuing the next data frame, if no evaluated link length difference ensures that the next data frame will be received at the destination node after the first data frame is received at the destination node via the other available communication link, and transmitting the next data frame across the other available communication link, if a delay introduced by the queuing operation and the evaluated link length difference ensures that the next data frame will be received at the destination node via the other available communication link after the first data frame is received at the destination node.

9. A programmable hardware mechanism storing executable instructions for performing a programmed process that transmits a sequence of ordered data frames from a source node over a plurality of communication links to provide in-order delivery of the data frames at a destination node, the programmed process comprising:

computing a link length difference for each pair of communication links based on a link length characteristic of each communication link in the pair;

transmitting to the destination node a first data frame of the ordered data frames over a first link of the communication links;

selecting a second link of the communication links based on the link length difference associated with the first and second links to ensure that a next data frame of the ordered data frames is received at the destination node after the first data frame is received at the destination node; and transmitting the next data frame over the second link to the destination node.

10. The programmable hardware mechanism of claim 9 wherein the computing operation comprises:

detecting the link length characteristic associated with each communication link; and computing the link length difference for a pair of communication links based on the detected link length characteristic of each communication link in the pair.

11. The programmable hardware mechanism of claim 9 wherein the computing operation comprises:

detecting the link length characteristic associated with each communication link, wherein the link length difference for a pair of communication links is computed from a difference between the detected link length characteristics of the communication links in the pair.

12. The programmable hardware mechanism of claim 9 further comprising:

maintaining a record identifying a communication link across which a data frame is transmitted.

13. The programmable hardware mechanism of claim 9 further comprising:

maintaining status information on a data frame transmitted across the communication links.

14. The programmable hardware mechanism of claim 9 wherein the selecting operation further comprises:

comparing information about the next data frame with information about other data frames being transmitted across the communication links; and if the information about the next data frame does not match the information about any of the other data frames, then transmitting the next data frame across any available communication link.

15. The programmable hardware mechanism of claim 9 wherein the selecting operation further comprises:

comparing information about the next data frame with information about other data frames being transmitted across the communication links; and if the information about the next data frame matches the information about any of the other data frames, then evaluating a link length difference between the communication link across which the matching data frame was transmitted and another available communication link, and transmitting the next data frame across the other available communication link, if the evaluated link length difference ensures that the next data frame will be received at the destination node via the other available communication link after the first data frame is received at the destination node.

16. The programmable hardware mechanism of claim 9 wherein the selecting operation further comprises:

comparing information about the next data frame with information about other data frames being transmitted across the communication links; and if the information about the next data frame matches the information about any of the other data frames, then evaluating link length differences between the communication link across which the matching data frame was transmitted and other available communication links, queuing the next data frame, if no evaluated link length difference ensures that the next data frame will be received at the destination node after the first data frame is received at the destination node via the other available communication link, and transmitting the next data frame across the other available communication link, if a delay introduced by the queuing operation and the evaluated link length difference ensures that the next data frame will be received at the destination node via the other available communication link after the first data frame is received at the destination node.

17. A system for transmitting a sequence of ordered data frames from a source node over a plurality of communication links to provide in-order delivery of the data frames to a destination node, the system comprising:

a link controller that computes a link length difference for each pair of communication links based on a link length characteristic of each communication link in the pair;

a switch transmitting to the destination node a first data frame of the ordered data frames from the source node over a first link of the communication links;

a transmit queue scheduler that selects a second link of the communication links based on the link length difference associated with the first and second links to ensure that a next data frame of the ordered data frames from the source node is received at the destination node after the first data frame is received at the destination node, wherein the switch transmits the next data frame over the second link to the destination node.

18. The system of claim 17 wherein the link controller detects the link length characteristic associated with each communication link and computes the link length difference for a pair of communication links based on the detected link length characteristic of each communication link in the pair.

19. The system of claim 17 wherein the link controller detects the link length characteristic associated with each communication link, wherein the link length difference for a pair of communication links is computed from a difference between the detected link length characteristics of the communication links in the pair.

20. The system of claim 17 wherein the transmit queue scheduler maintains a record identifying a communication link across which a data frame is transmitted.

21. The system of claim 17 wherein the transmit queue scheduler maintains status information on a data frame transmitted across the communication links.

22. The system of claim 17 wherein the transmit queue scheduler compares information about the next data frame with information about other data frames being transmitted across the communication links, and if the information about the next data frame does not match the information about any of the other data frames, the switch transmits the next data frame across any available communication link.

23. The system of claim 17 wherein the transmit queue scheduler compares information about the next data frame with information about other data frames being transmitted across the communication links, and if the information about the next data frame matches the information about any of the other data frames, the transmit queue scheduler evaluates a link length difference between the communication link across which the matching data frame was transmitted and another available communication link, and transmits the next data frame across the other communication link, if the evaluated link length difference ensures that the next data frame will be received at the destination node via the other available communication link after the first data frame is received at the destination node.

24. The system of claim 17 wherein the transmit queue scheduler compares information about the next data frame with information about other data frames being transmitted across the communication links, and if the information about the next data frame matches the information about any of the other data frames, then the transmit queue scheduler evaluates link length differences between the communication link across which the matching data frame was transmitted and other available communication links, queues the next data frame, if no evaluated link length difference ensures that the next data frame will be received at the destination node after the first data frame is received at the destination node via the other available communication link, and transmits the next data frame across the other available communication link, if a delay introduced by the queuing operation and the evaluated link length difference ensures that the next data frame will be received at the destination node via the other available communication link after the first data frame is received at the destination node.

* * * * *